United States Patent
Hoelzel et al.

(10) Patent No.: US 10,899,085 B2
(45) Date of Patent: Jan. 26, 2021

(54) METHOD FOR PRODUCING A MULTI-COMPONENT PART OF A VEHICLE

(71) Applicant: Dr. Ing. h.c. F. Porsche Aktiengesellschaft, Stuttgart (DE)

(72) Inventors: Steffen Hoelzel, Eberdingen (DE); Fuat Kayadere, Heilbronn (DE); Markus Paulitsch, Karlsruhe (DE); Joerg Russ, Altdorf (DE); Matthias Baier, Oberscheinfeld (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 238 days.

(21) Appl. No.: 15/891,465

(22) Filed: Feb. 8, 2018

(65) Prior Publication Data

US 2018/0229438 A1 Aug. 16, 2018

(30) Foreign Application Priority Data

Feb. 14, 2017 (DE) .................. 10 2017 102 881

(51) Int. Cl.
*B29C 65/00* (2006.01)
*B29B 13/02* (2006.01)
(Continued)

(52) U.S. Cl.
CPC ........ *B29C 66/0242* (2013.01); *B29B 13/023* (2013.01); *B29B 13/08* (2013.01);
(Continued)

(58) Field of Classification Search
CPC ............ B29C 66/0242; B29C 66/0322; B29C 35/0805; B29C 43/18; B29C 65/70;
(Continued)

(56) References Cited

U.S. PATENT DOCUMENTS

| 5,240,536 A | 8/1993 | Kurobe |
| 2006/0086774 A1 | 4/2006 | Sanders et al. |

(Continued)

FOREIGN PATENT DOCUMENTS

| CN | 85109051 | 6/1987 |
| CN | 104228983 | 12/2014 |

(Continued)

OTHER PUBLICATIONS

Machine Translation of EP-2468481-A2 (Year: 2012).*

(Continued)

*Primary Examiner* — Daniel McNally
(74) *Attorney, Agent, or Firm* — Gerald E. Hespos; Michael J. Porco; Matthew T. Hespos

(57) ABSTRACT

A method for producing a multi-component part (200) of a vehicle includes inserting an air-guiding device (10) having at least one contact portion (40) into a cavity (310) of a tool (300). The method then includes heating a composite part (100) having at least one mating contact portion (140) to a melting point of at least one material of the composite part (100), and heating the contact portion (40) of the air-guiding device (10) to a melting point of at least one material of the contact portion (40). The method further includes inserting the heated composite part (100) into the cavity (310) of the tool (300) and pressing the heated composite part (100) into a geometry of the part while simultaneously forming an integrally bonded connection between the mating contact portion (140) of the composite part (100) and the contact portion (40) of the air-guiding device (10).

6 Claims, 5 Drawing Sheets

(51) Int. Cl.
*B29C 70/78* (2006.01)
*B60K 11/08* (2006.01)
*B29B 13/08* (2006.01)
*B62D 35/02* (2006.01)
*B29C 43/18* (2006.01)
*B29C 35/08* (2006.01)
*B29C 65/70* (2006.01)
*B29C 65/72* (2006.01)
*B29C 65/78* (2006.01)
*B29L 31/30* (2006.01)
*B29C 65/14* (2006.01)
*B29C 51/12* (2006.01)
*B29C 43/52* (2006.01)

(52) U.S. Cl.
CPC .......... *B29C 35/0805* (2013.01); *B29C 43/18* (2013.01); *B29C 65/70* (2013.01); *B29C 65/72* (2013.01); *B29C 65/7844* (2013.01); *B29C 66/0322* (2013.01); *B29C 70/78* (2013.01); *B60K 11/08* (2013.01); *B62D 35/02* (2013.01); *B29C 43/52* (2013.01); *B29C 51/12* (2013.01); *B29C 65/1412* (2013.01); *B29C 65/1432* (2013.01); *B29C 65/1467* (2013.01); *B29C 65/7841* (2013.01); *B29C 66/112* (2013.01); *B29C 66/1122* (2013.01); *B29C 66/131* (2013.01); *B29C 66/30223* (2013.01); *B29C 66/524* (2013.01); *B29C 66/532* (2013.01); *B29C 66/71* (2013.01); *B29C 66/721* (2013.01); *B29C 66/73921* (2013.01); *B29C 66/8322* (2013.01); *B29C 66/8432* (2013.01); *B29C 2035/0822* (2013.01); *B29L 2031/30* (2013.01); *B29L 2031/3058* (2013.01); *Y02T 10/88* (2013.01)

(58) Field of Classification Search
CPC ..... B29C 65/72; B29C 65/7844; B29C 70/78; B29B 13/023; B29B 13/08; B60K 11/08; B62D 35/02
See application file for complete search history.

(56) References Cited

U.S. PATENT DOCUMENTS

| | | | |
|---|---|---|---|
| 2010/0068464 A1* | 3/2010 | Meyer | B22F 5/00 428/161 |
| 2010/0186899 A1 | 7/2010 | Jackson | |
| 2011/0175395 A1 | 7/2011 | Guigne | |
| 2012/0061992 A1 | 3/2012 | Ezaka | |
| 2012/0280533 A1 | 11/2012 | Gaechter et al. | |
| 2014/0367992 A1 | 12/2014 | Brandscheid et al. | |
| 2015/0203186 A1* | 7/2015 | Lunney | B29C 65/564 428/120 |

FOREIGN PATENT DOCUMENTS

| | | | | |
|---|---|---|---|---|
| DE | 102010056032 A1 | | 6/2012 | |
| DE | 102014207948 A1 | | 10/2015 | |
| DE | 10 2014 113 006 | | 3/2016 | |
| DE | 102014113006 A1 | * | 3/2016 | ............. B29C 51/12 |
| EP | 2468481 A2 | * | 6/2012 | ............. B29C 43/36 |
| EP | 2 995 440 | | 3/2016 | |
| GB | 2481640 A | | 4/2012 | |
| JP | H03180330 A | | 8/1991 | |
| JP | 2004306935 A | * | 11/2004 | |
| JP | 2004306935 A | | 11/2004 | |
| RU | 2 112 686 | | 6/1998 | |
| RU | 2 537 011 | | 12/2014 | |

OTHER PUBLICATIONS

Machine Translation of DE-102014113006-A1 (Year: 2016).*
Translation of JP-2004306935-A (Year: 2004).*
Chinese Office Action dated Sep. 23, 219.
German Search Report dated Aug. 17, 2018.
Great Britain Comined Search and Examination Report dated Jul. 25, 2018.
Russian Search Report dated Feb. 13, 2019.
Chinese Office Action dated Jun. 4, 2020.

* cited by examiner

METHOD FOR PRODUCING A MULTI-COMPONENT PART OF A VEHICLE

BACKGROUND

Field of the Invention

The present invention relates to a method for producing a multi-component part of a vehicle, and to an air-guiding device for made by such a method.

Description of the Related Art

Lightweight materials often are used in the production of vehicles to save weight and therefore fuel for the vehicle. This leads to outer parts of the motor vehicle being produced from lightweight construction materials. The same is also true of the underbody of the vehicle. In the case of sports vehicles, air-guiding devices, for example spoiler systems, frequently are fastened to the outer parts of the vehicle. In order to fasten such spoiler systems to parts composed of lightweight construction materials, a screw connection or a rivet connection customarily is provided. In particular, this is the case in what are referred to as LWRT materials, which are also referred to as lightweight reinforced thermoplastics. These involves a thermoplastic matrix in which reinforcing gas fibers or fibers of other materials are embedded. Such LWRT materials customarily are heated in the form of plate-like preforms and subsequently are subjected to a deformation process in which the heated LWRT material is pressed into its desired, final, three-dimensional shape.

A disadvantage of the known solutions is that, after the pressing, composite parts, in particular LWRT parts, have to be connected to the associated air-guiding devices with an additional step. This leads to extra effort in the installation and therefore to higher manufacturing costs. It is a further disadvantage that, because of the connecting means in the form of screws or rivets, plural additionally parts are required. Not least, a reinforced configuration in these regions of use is necessary in order to provide the necessary mechanical stability, and therefore, because of this reinforced configuration, a higher use of material and greater weight should again be expected.

It is the object of the present invention to at least partially eliminate the disadvantages described above. In particular, it is the object of the present invention to reduce the manufacturing costs in a cost-effective and simple manner and to retain or even improve the mechanical stability.

SUMMARY

The above object is achieved by a method and an air-guiding device as described, illustrated and claimed herein. Features and details that are described in conjunction with the method of the invention also of course apply here in conjunction with the air-guiding device of the invention, and vice versa in each case, and therefore, with regard to the disclosure, reference is always, and can always be, made reciprocally to the individual aspects of the invention.

The invention relates to a method for producing a multi-component part of a vehicle, such as a method for producing an underbody of a vehicle. Such a method has the following steps:

inserting at least one air-guiding device having at least one air-guiding portion and at least one contact portion into a holding portion of a cavity of a tool device, heating a composite part having at least one mating contact portion for a pressing operation to a melting point of at least one material component of the composite part, heating the at least one contact portion of the at least one air-guiding device to a melting point of at least one material component of the contact portion of the air-guiding device, inserting the heated composite part into the cavity of the tool device, pressing the heated composite part into a geometry of the part with simultaneous formation of an integrally bonded connection between the at least one mating contact portion of the composite part and the contact portion of the air-guiding device.

A method according to the invention therefore joins both the production and pressing or deformation of the composite part to the connection of the air-guiding device. The method, therefore, leads to the elimination of at least one installation step, namely, eliminating the step of fastening the air-guiding device to the composite part by connecting parts. Production costs and additional weight can therefore be reduced by the omission of the connecting parts.

According to the invention, a combination of at least two parts now can be carried out. First, a composite part is provided and may be designed as what is referred to as an LWRT part or as an LWRT preform. Such a composite part or such an LWRT preform is heated in order, in the heated state, to have a temperature to the effect that a matrix material within the composite part in a molten state is present in a temperature above the melting point of the material. Since, in such a state, the composite part has a flexible state, the composite part can be clamped in a clamping frame at the time of the heating. Furthermore, the air-guiding devices now are located in a cavity, in a manner inserted into associated holding portions. The air-guiding devices are equipped with contact portions that are configured for connection to the composite part. In order to be able to provide said connection in an integrally bonded manner, the contact portions, in particular only or exclusively the contact portions of the air-guiding devices, now likewise are heated. The contact portions of the air-guiding devices therefore also are brought to a temperature to the effect that they can undergo an integrally bonded connection with the associated matrix material of the composite material of the composite part.

As soon as the heated air-guiding devices and the heated composite part have been inserted into the cavity, the pressing can take place. During the pressing, two functions automatically are carried out simultaneously. First, the desired three-dimensional shape is pressed or deformed from a flat composite part within the cavity in a known manner. A cooling process also may take place at this time to lead to a solidification of the matrix material in the composite part. At the same time, however, during the pressing or the deformation, a pressing force also is exerted on the contact portions of the air-guiding devices via the mating contact portions of the composite part. For this purpose, the associated tool may be designed in such a manner that there is complete consolidation at the contact portions of the composite part, and therefore a pressing force acts on the contact portions. By means of an increased pressing force between the contact portions and the mating contact portions and also the preceding heating of these two materials, an integrally bonded connection and, as it were, pressing welding take place in said contact portions. Also here, additional cooling can be carried out during the pressing operation or the deformation operation or following the pressing operation or the deformation operation. As soon as the pressing operation has finished, the tool device is opened and a multi-component part, in which the individual air-guiding devices are already formed fixedly connected in an integrally bonded manner to the composite part, can be removed from the cavity. As can be gathered from this step, additional steps for installation of the air-guiding devices are omitted. Also, no additional fastening means in the form of rivets or screws are necessary to carry out such a fastening. In addition to a reduction in the production costs, the production is accelerated and at the same time a multi-component part that has a lower weight with the same or even improved stability is possible.

The corresponding materials in the parts can be, for example, plastics. For example, the material to be melted in the composite part can be a polypropylene. An identical, but also a different component is usable as the material in the contact portion of the air-guiding portion. An example is TPE. Of course, other combinations of materials can also be usable for a method according to the invention.

The heating of the composite part and/or the heating of the at least one contact portion of the air-guiding device may be carried out by thermal radiation. In other words, contactless transmission of heat is provided to ensure the input of heat in the composite part and/or in the contact portion of the air-guiding device. For example, infrared emitters can be provided to transmit thermal radiation. The contactless transmission of the heat by thermal radiation is particularly cost-effective and simple. Furthermore, use for a wide variety of geometries is possible because of the lack of a contact connection. The heat emitters can thus be arranged irrespective of which actual geometry the respective contact portion and/or the composite part have/has in their/its state to be irradiated. A more flexible use can therefore also be obtained even for different geometries in one and the same tool device. The heat emitters can also input differing thermal energy. This increases the flexibility in order to further optimize the welding process.

A complete or substantially complete form-fitting connection may be formed between the at least one contact portion of the air-guiding device and the at least one mating contact portion of the composite part. In principle, an integrally bonded connection is possible or sufficient in partial portions of the contact portion. However, to ensure mechanical stability that is maximized as far as possible, the integrally bonded connection may be formed completely or substantially completely. This means that, during the heating steps, the contact portions and the mating contact portions are substantially completely heated up in order to exceed the melting point of the associated material components in all regions. During the pressing, a constant and continuous pressing force may be applied over the entire contact portion and the entire mating contact portion in order also to be able to provide a complete contact connection and welding to produce the integrally bonded connection over the entire width of the contact portions. The welding connection, therefore, is secured to an even greater extent and, furthermore, undesirable air inclusions within the welded connection can be avoided or reduced.

The step of heating the at least one contact portion of the air-guiding device, may include thermally insulating further portions of the air-guiding device, in particular the air-guiding portion, against the heating. During the thermal heating, in particular by thermal radiation, a matrix material or material component of the contact portion of the air-guiding device is heated up to such an extent that a melting point of the material component is exceeded. The air-guiding device can be composed of a single material mixture or a plurality of different material mixtures. If, however, the air-guiding portion is formed from the same material mixture, as is also true of the contact portion, heating would possibly lead to a loss in the stability of the air-guiding portion during the pressing operation. To avoid undesirable deformations, targeted heating can take place exclusively in the desired regions by the thermal insulation of the air-guiding portion or of other portions of the air-guiding device that are formed separately from the respective contact portion. In other words, material components in other portions of the air-guiding device remain substantially unaffected by the thermal radiation because of the thermal insulation, and therefore the corresponding material component in the other portions does not exceed the melting point either. In other words, the mechanical stability is maintained or substantially maintained in further portions of the air-guiding device despite the heating of the contact portions.

The air-guiding device having the at least one air-guiding portion may be inserted into the holding portion of the cavity. The holding portion may be designed for receiving the air-guiding portion in a form-fitting manner. The holding portion therefore serves to provide mechanical support and therefore to ensure the dissipation of force during the pressing operation. Furthermore, centering can also be provided by the corresponding holding portion, and therefore an exact positioning of the respective air-guiding device relative to the three-dimensional shape of the multi-component part to be produced is provided. The mechanical stabilization avoids an undesirable folding over of the air-guiding portion during the pressing operation. The depression within the holding portion can be of such a size here that air-guiding portions of differing length can fit therein. The flexibility of the use of the tool device therefore is increased significantly. The air-guiding portions of differing size and having corresponding air-guiding surfaces can therefore be provided with different vehicles. If, for example, sports vehicles are designed for high speeds and aerodynamic down thrust, the corresponding underbody can be provided in the form of a multi-component part with air-guiding portions of appropriate length. If, by contrast, an average vehicle is involved, only a smaller air-guiding surface will be necessary for the air-guiding portion. The shorter extent of the air-guiding portion then also fits into the holding portions, which are of basically deep design, of the cavity, and therefore one and the same tool device can also be used for manufacturing such a multi-component part.

Of course, the holding portion can also have thermal insulation as has been explained in more detail in the preceding paragraph.

The present invention likewise relates to an air-guiding device that may be manufactured in a method according to the invention. The air guiding device has a basic body with at least one air-guiding portion and at least one contact portion. The contact portion is designed for contacting a mating contact portion of a composite part. The contact portion has at least one material component for an integrally bonded connection to a material component of the mating contact portion of the composite component. Both the composite part and the air-guiding device can have a single material mixture or a combination of different material mixtures. Of course, depending on the use situation, both the one or the other way or the desired combination may afford advantages. The composite part may be an LWRT part that already has been explained. The air-guiding device itself can have, for example, a T-shaped cross section, and therefore the contact portion extends transversely and in particular perpendicularly or substantially perpendicularly to the air-guiding portion. The basic body may be formed substantially exclusively from the at least one contact portion and the air-guiding portion to avoid additional weight and additional construction space. An air-guiding device according to the invention therefore affords the same advantages as have been explained in detail with regard to a method according to the invention. In addition, the necessary construction space is reduced by the omission of additional fastening means.

At least portions of the at least one contact portion may have a surface enlargement, in particular in the form of surface elevations. For example, attached fins having a triangular cross section or different cross section can be provided to provide an increased surface for the contact portion. The increased surface leads to the input of heat being improved. The step of the method according to the invention for heating the contact portion is accelerated by the surface enlargements since a greater amount of heat can be input in the same period of time. Furthermore, the active contact surface for the subsequent pressing operation is increased to obtain welding into an integrally bonded connection as rapidly and advantageously as possible. Furthermore, a guiding function can be predetermined by the surface enlargement. For example, the surface increases can be designed in the manner of channels to dissipate or squeeze out air inclusions, which might arise during the pressing operation, from the connecting portion between the contact portion and the mating contact portion. Not least, the surface enlargement in the form of a finned structured can give rise to a local increase in pressure that leads to an improved integrally bonded connection during the pressing operation.

The at least one contact portion may be arranged on a side of the basic body that faces away from the at least one air-guiding portion and in particular has a depression correlating with the at least one air-guiding portion. The depression therefore may run on the rear side of the basic body along the geometrical extent of the air-guiding portion. The depression can also be designed as a bead on the rear side. During the pressing, the surface reduction or said material reduction avoids an undesirable deformation during the pressing to provide the air-guiding portion. The correlating depression can likewise also be used for dissipating air during the pressing operation. Not least, the reduced wall thickness in the region of said depression will lead to a reduced cooling time, which, in turn, has a positive effect on the entire manufacturing time.

The at least one contact portion may have a first partial contact portion and a second partial contact portion. The first partial contact portion may be arranged on the pressure side with respect to the at least one air-guiding portion and may have a smaller width extent from the at least one air-guiding portion than the second partial contact portion, which is arranged on the negative pressure side with respect to the at least one air-guiding portion. As soon as the multi-component part is in the position fastened to the vehicle, the vehicle has a defined forward direction of travel. During the movement in the forward direction of travel, a corresponding air flow approaches the air-guiding portion. The approach-flow side is called the pressure side or the negative pressure side arranged on the opposite side is acted upon with a smaller pressure. As a result of the fact that now, during use, an air flow approaches the air-guiding portion in a defined manner, the force ratios that arise during use can basically be predicted. If in particular a substantially T-shaped cross section is provided, this leads to a tensile force acting on the first partial contact portion while a compressive force for transmission to the composite part acts on the second partial contact portion. In order now to load the integrally bonded connection in an advantageous manner, an asymmetrical displacement of the distribution of force is obtained by the width extent being able to be formed asymmetrically. The portion of the force that is transmitted into the composite component from the air-guiding device via pressure is increased while the transmission of tensile forces from the first partial contact portion is reduced significantly by the smaller width extent. With the same mechanical stability and same size of the entire multi-component part, this leads to an increased service life and in particular to an increased load-bearing capacity during use in a corresponding vehicle.

At least portions of the at least one air-guiding portion may have a different material than the at least one contact portion. Such an air-guiding device can also be referred to as a two-component air-guiding device or two-component spoiler. In particular, only the contact portion is provided here for the desired integrally bonded connection, while the air-guiding portion can have different material components. A certain basic flexibility can thereby be formed in the air-guiding portion, and therefore, when the air-guiding device is used on the underbody of the vehicle, a hard touchdown does not lead to permanent damage of the air-guiding device, but rather, on the contrary, because of the appropriate choice of material, elastic resetting forces bring the air-guiding portion back again into the desired position.

Further advantages, features and details of the invention emerge from the description below, in which exemplary embodiments of the invention are described in detail with reference to the drawings. The features mentioned in the claims and in the description may be essential to the invention in each case individually by themselves or in any desired combination.

DETAILED DESCRIPTION

The method according to the invention will be explained in more detail with reference to FIGS. 1 to 6. It should also be pointed out in particular here that the steps of heating the composite part 100 or the contact portions 40 of the air-guiding device 10 can basically be carried out in parallel or in any desired sequence. It is crucial that, when brought together in the tool device, the two parts, namely the composite part 100 and the contact portions 40 of the air-guiding device 10 have the desired temperature above the melting point of the respective material component.

Figure 1:
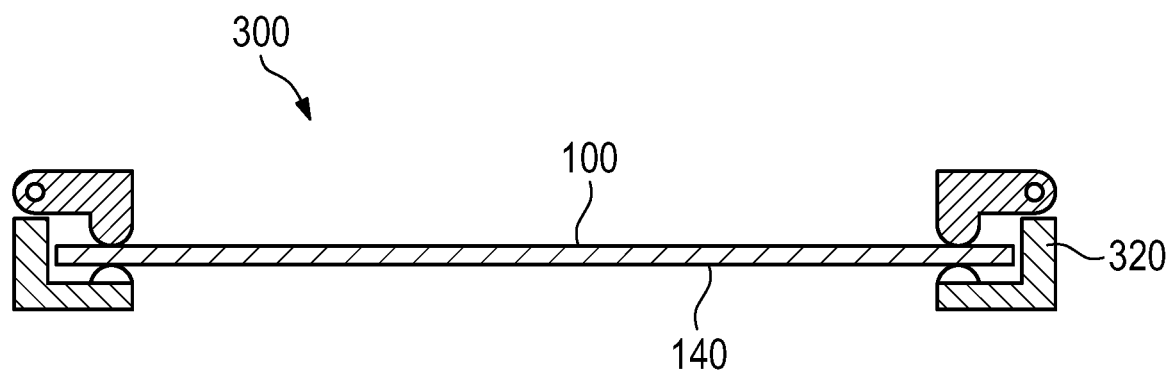
FIG. 1 shows a first step of a method according to the invention.
Figure 2:
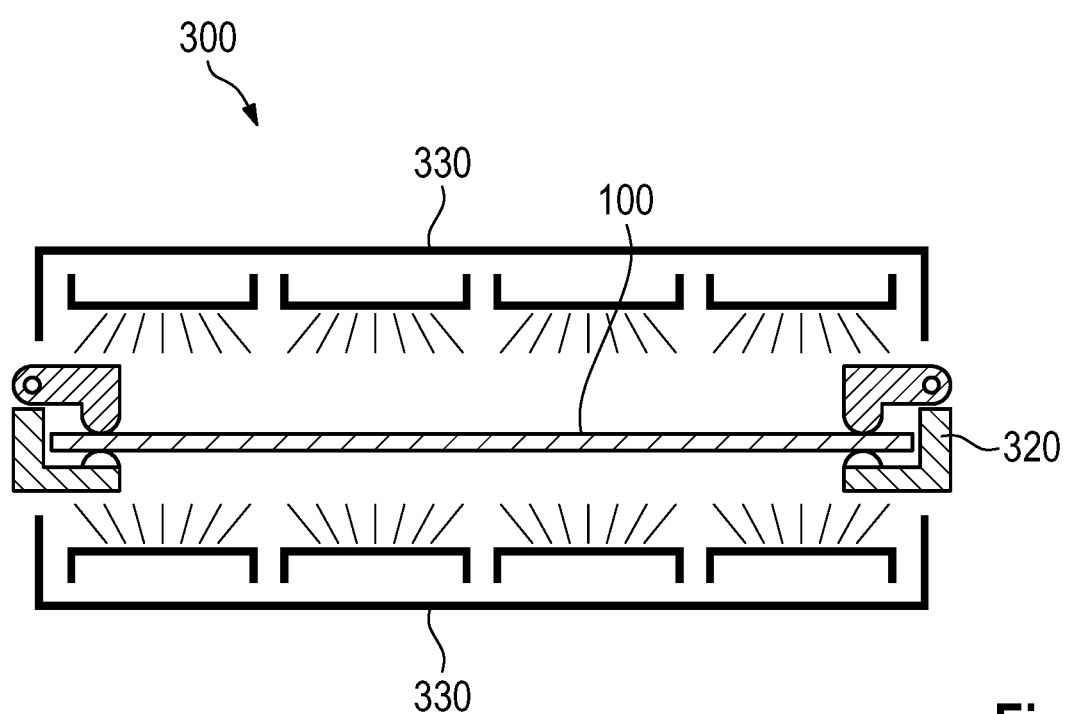
FIG. 2 shows a further step of a method according to the invention.

In FIG. 1, the composite part 100, for example in the form of an LWRT preform, is provided in a clamping frame 320. The composite part 100 is already provided here with contact portions 140 which merge into the corresponding basic body of the composite part 100. The optional clamping frame 320 serves for the holding, in particular if, with the aid of the heating device 330 via infrared emitters, the composite part 100 is brought to a temperature which lies above the melting point of the matrix material of the composite part 100. The composite part 100 is thus heated up at this time to such an extent that the matrix material is melted and therefore the composite part 100 is of substantially flexible design.

Figure 3:
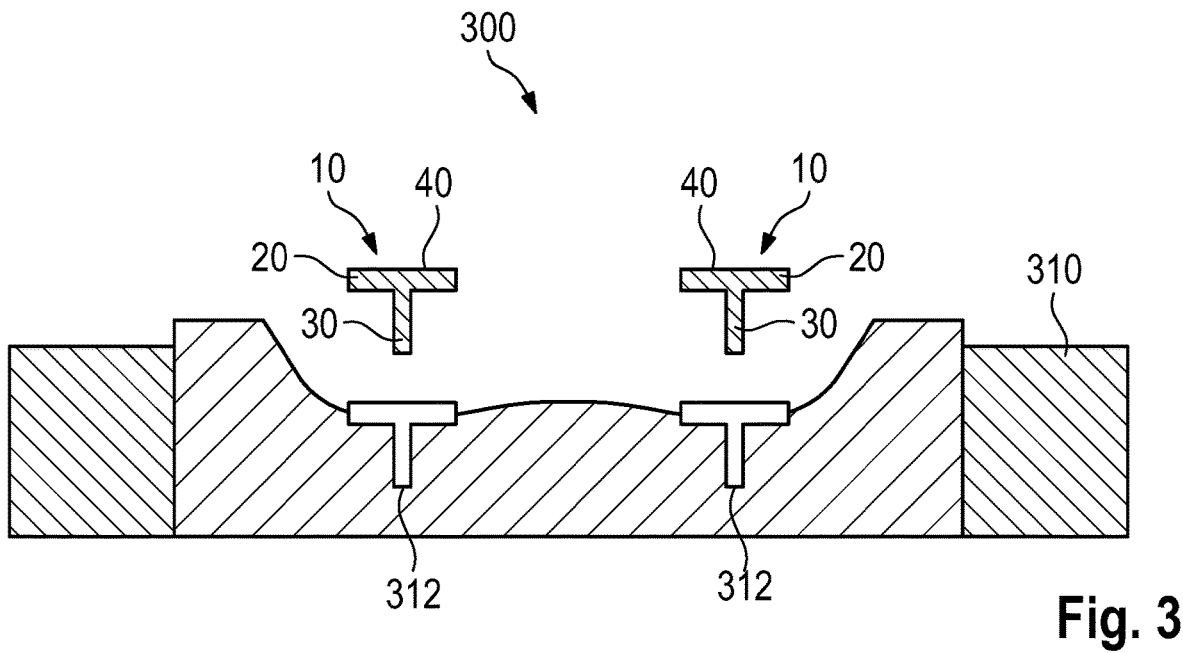
FIG. 3 shows a further step of a method according to the invention.
Figure 4:
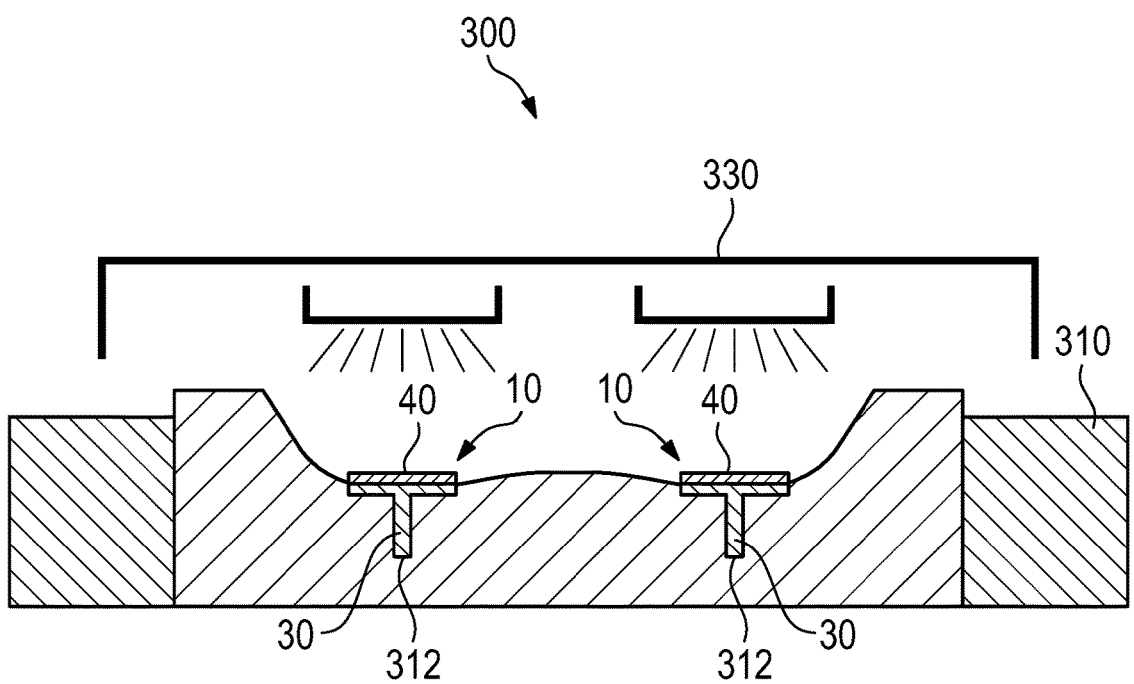
FIG. 4 shows a further step of a method according to the invention.
Figure 5:
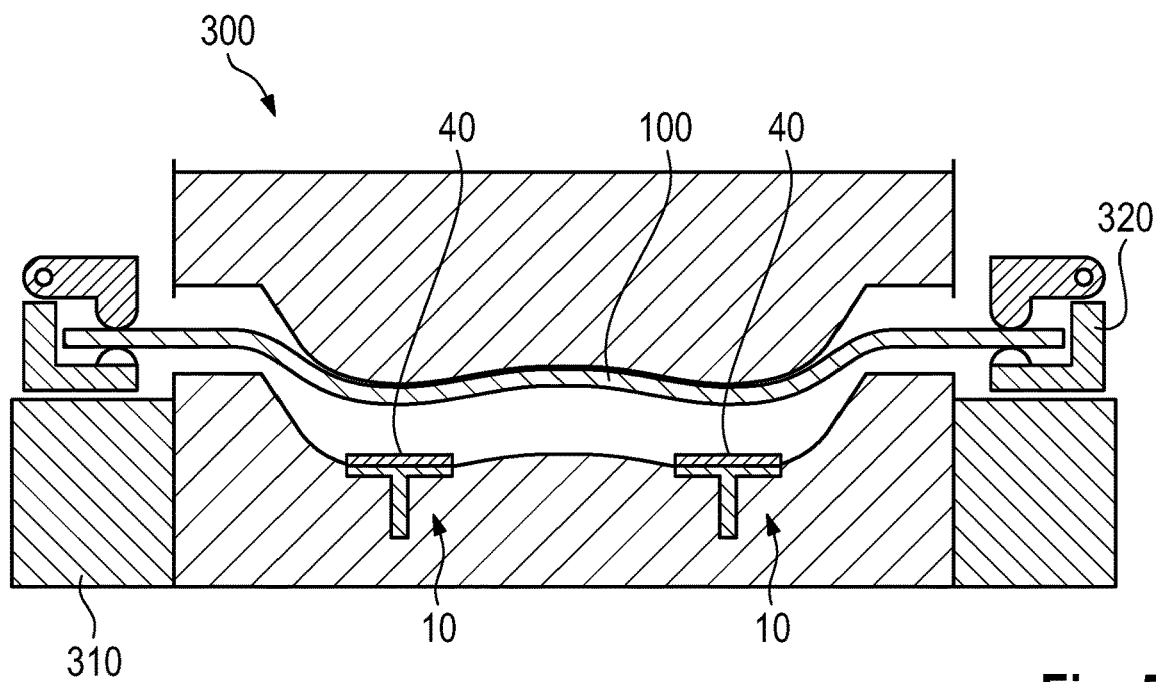
FIG. 5 shows a further step of a method according to the invention.
Figure 6:
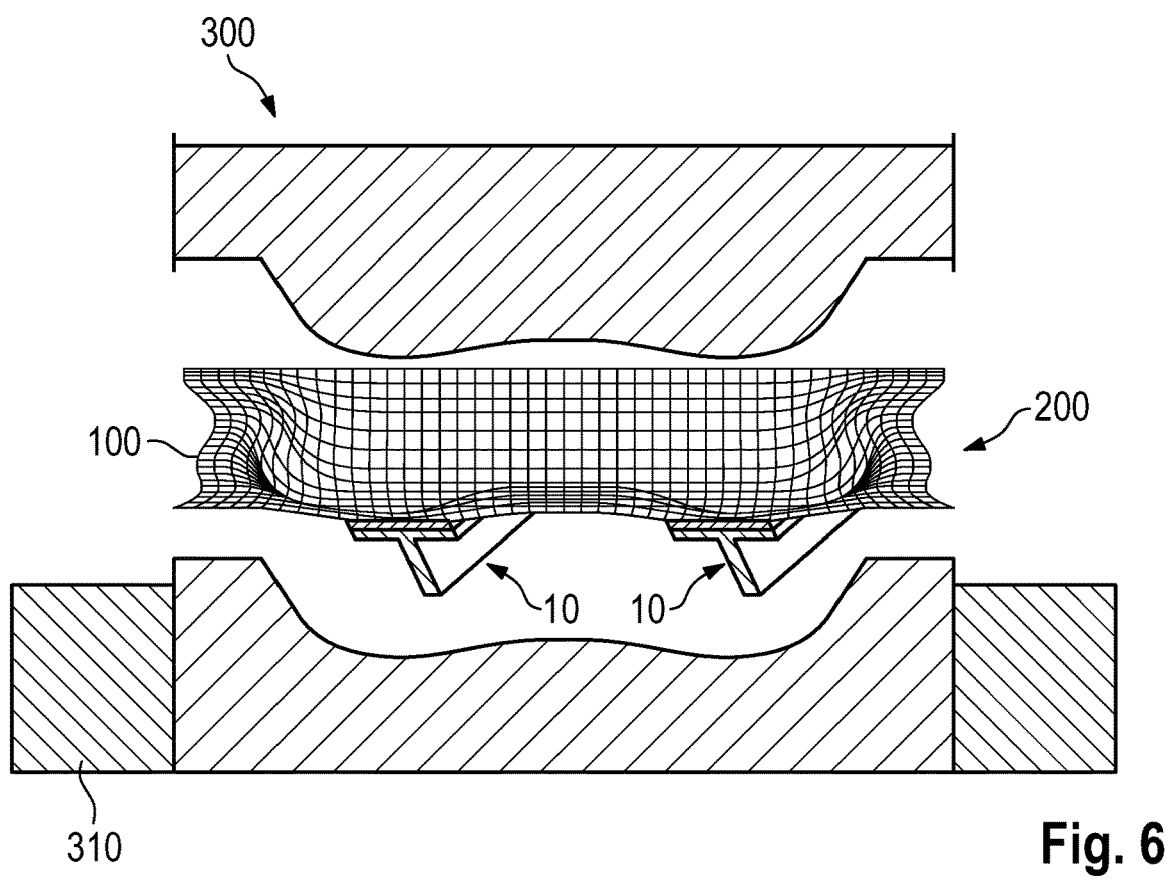
FIG. 6 shows a further step of a method according to the invention.

The insertion of the air-guiding devices 10 takes place previously, afterwards or in parallel in terms of time, as shown in FIG. 3. The basic bodies 20 of the air-guiding devices 10 are inserted with their air-guiding portions 30 into the associated holding portions 312 of the cavity 310 of the tool device 300. FIG. 4 shows the inserted state. In this state, the air-guiding portions 30 are mechanically stabilized by means of the form-fitting reception in the holding portions 312. At the same time, the cavity 310, by means of its form-fitting connection around the air-guiding portions 30, serves for thermal insulation or for dissipating the heat into the tool, and therefore, by means of the heating device 330, only the contact portions 40 and only to a smaller extent, if at all, the air-guiding portions 30 are also brought here by means of the thermal radiation to the corresponding temperature. As soon as the contact portions 40 have likewise reached a temperature which lies above the melting point of a matrix material in said contact portions 40, the composite part 100 which has already been heated up can now be introduced, according to FIG. 5, together with the clamping frame 320 into the cavity 310. The cavity 310 is closed or pushed on from above by means of the tool device 300 with a punch, as shown in FIG. 5. As soon as the cavity 310 is completely closed, the contact portions 40 of the two air-guiding devices 10 are therefore now in direct contact with the associated mating contact portions 140 of the composite part 100. While, by means of the three-dimensional shaping of the cavity 310, firstly pressing and formation of said three-dimensional structure for the composite part 100 is provided, welding and therefore an integrally bonded connection of the heated contact portions 40 and of the heated mating contact portions 140 take place at the same time. Subsequently, an optional cooling step can be carried out which can lead to demolding of a multi-component part 200, as FIG. 6 shows. At this time, the contact portions 40 are therefore connected in an integrally bonded manner to the mating contact portions 140, and a multi-component part 200 has been produced here from a composite part 100 and two air-guiding devices 10.

Figure 7:
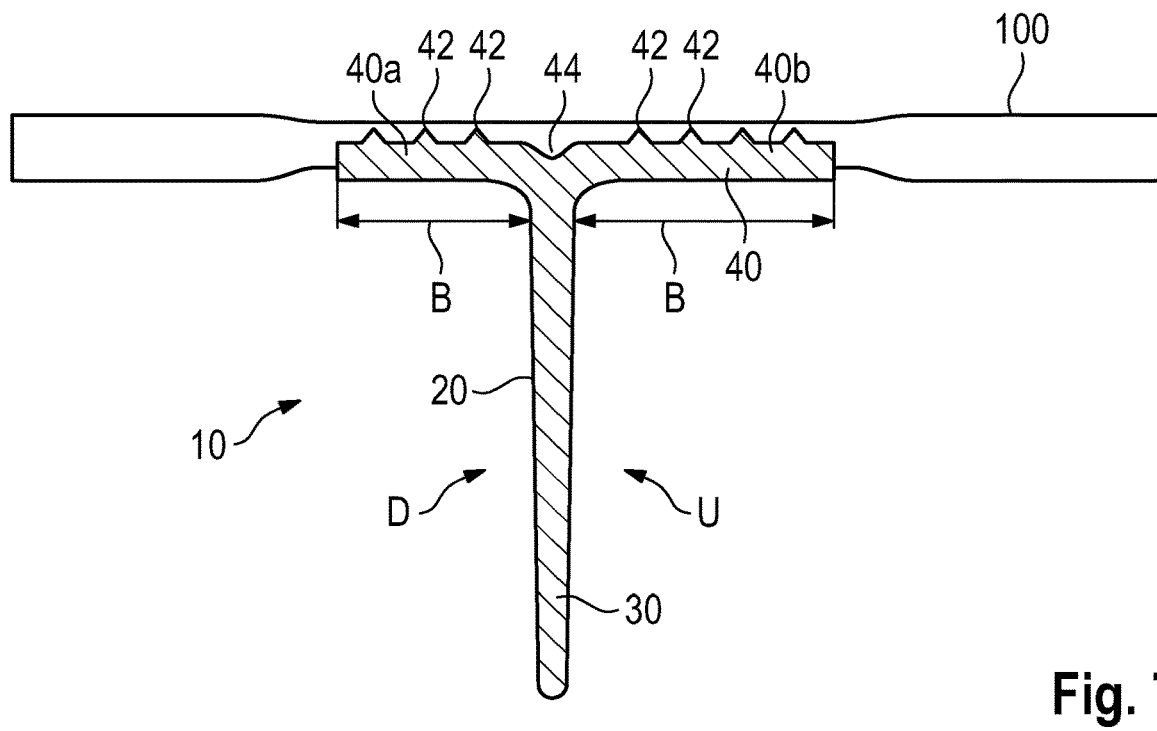
FIG. 7 shows an embodiment of an air-guiding device according to the invention.
Figure 8:
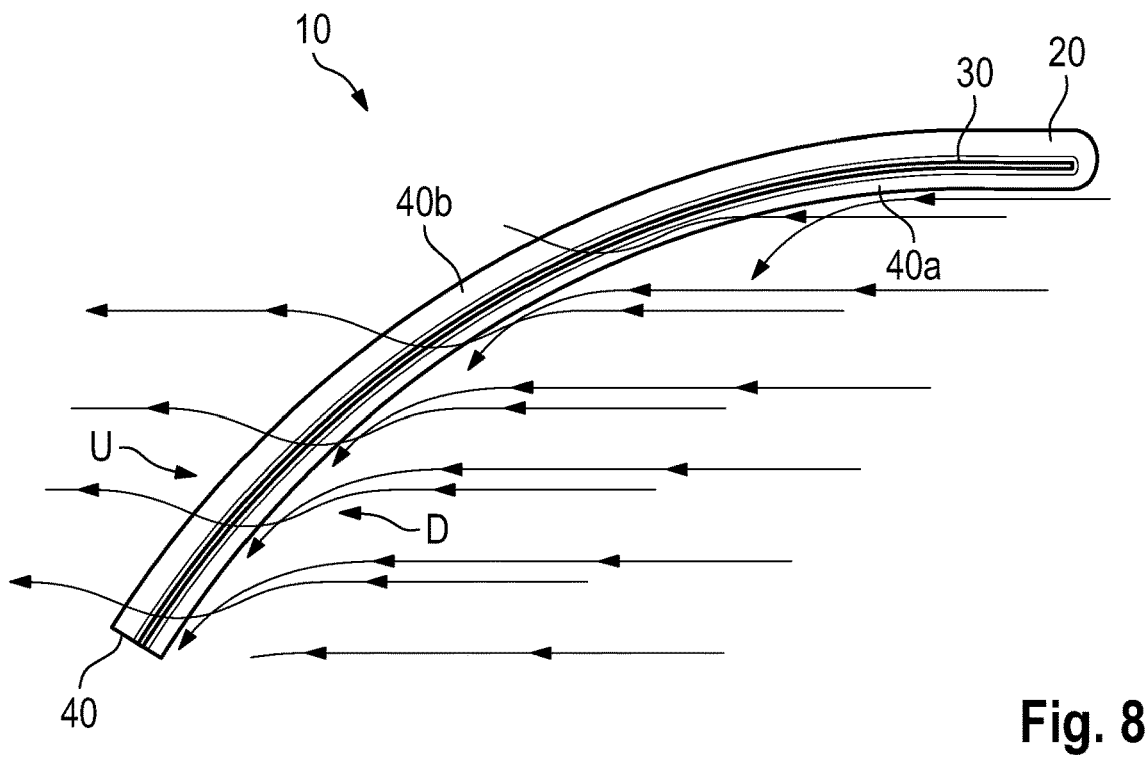
FIG. 8 shows a further embodiment of an air-guiding device according to the invention.

FIG. 7 shows one possibility of providing an air-guiding device 10. A cross section which is substantially T-shaped here has a basic body 20 which is equipped with a downwardly extending air-guiding portion 30. In a transverse extent, a contact portion 40 is of two-part design here. A first partial contact portion 40a with a smaller width extent B extends to the left on the pressure side D of the air-guiding device 10. A second partial contact portion 40b with a larger width extent B is located on the negative pressure side U of the air-guiding portion 30. It can be seen here in particular in correlation with FIG. 8 that an approach with an air flow takes place on the pressure side D. As soon as this is the case, the associated force from said air flow is then transmitted via tensile forces from the basic body 20 into the composite part 100 via the first partial contact portion 40a and via compressive forces via the second partial contact portion 40b. As a result of the fact that the width extent B on the pressure side D has now been reduced for the first partial contact portion 40a in comparison to the second partial contact portion 40b, the lever arm on this side is reduced, and therefore the portion of tensile forces to be transmitted is reduced and the portion of compressive forces to be transmitted is increased. This asymmetrical distribution of the introduction of pressure leads to an increase in the mechanical stability by means of the loading of an air flow.

As can likewise be gathered from FIG. 7, surface elevations 42 are provided on the upper side of the contact portion 40, here in the form of substantially fin-shaped configurations with a triangular cross section. Said surface elevations lead to a local pressure increase during the pressing operation and at the same time to an improved input of heat during the heating of the contact portion 40. The rear-side depression 44 which can likewise be seen in FIG. 7 and is designed here as a bead leads to a reduction in the material stressing during the pressing operation, and also later on during use of the air-guiding device 10.

Figure 9:
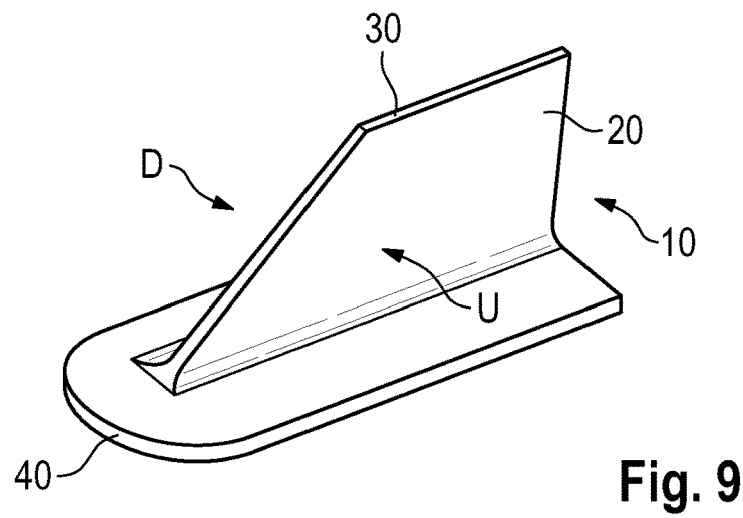
FIG. 9 shows the embodiment of FIG. 8 in another illustration.
Figure 10:
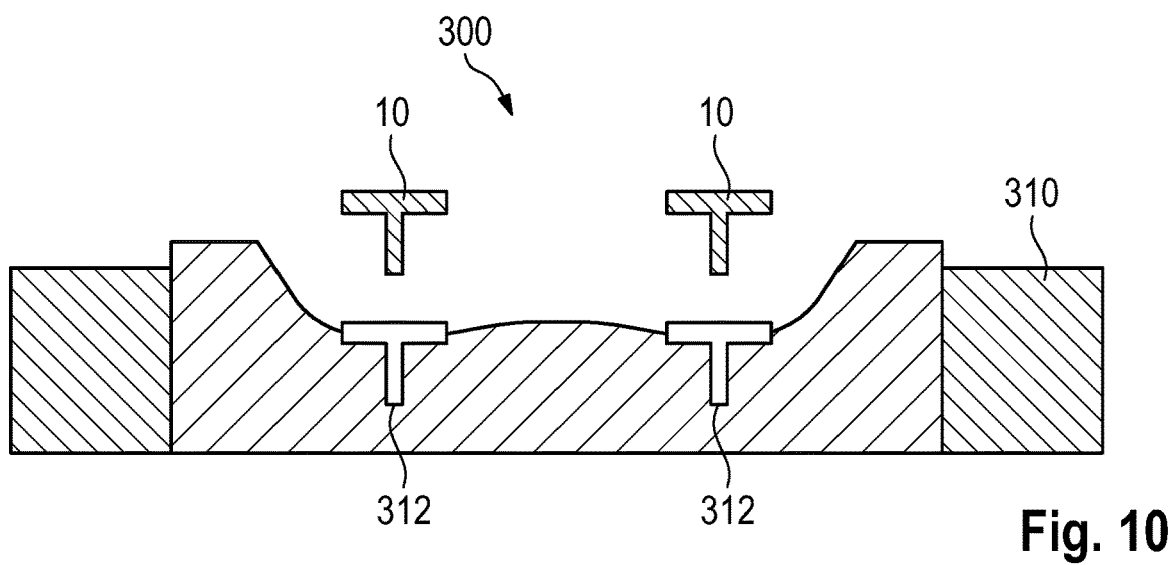
FIG. 10 shows an illustration of a tool device for use in a method according to the invention.
Figure 11:
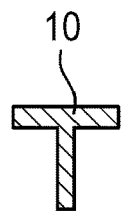
FIG. 11 shows another air-guiding device.
Figure 12:
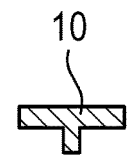
FIG. 12 shows another air-guiding device.

FIG. 9 also shows how the beginning of such an air-guiding device 10 having a correspondingly triangular section can be arranged or formed. It can also be seen once again here how the pressure side D and the negative pressure side U differ from each with respect to the contact portion 40. FIGS. 10 to 12 show how a tool device 300 can be used flexibly for different multi-component parts 200. The holding portions 312 here are of such deep design that not only can the normal air-guiding devices 10 be used, as are illustrated in FIG. 10 and also in FIGS. 3 to 6, but so to can particularly long air-guiding portions 30 of other air-guiding devices 10, as FIG. 11, for example, shows. If vehicles having a lower air-guiding functionality are desired, small air-guiding portions 30 of corresponding air-guiding devices 10 according to FIG. 12 can also be inserted into the same deep holding portions 312. The increased flexibility leads to the same tool device 300 being able to be used for a wide variety of desired multi-component parts 200.

The above explanation of the embodiments describes the present invention exclusively within the scope of examples. Individual features of the embodiments, if technically meaningful, can be freely combined with one another here without departing from the scope of the present invention.

What is claimed is:

1. A method for producing a multi-component part (200) of a vehicle, having the following steps:
   providing at least one T-shaped air-guiding device (10) having an air-guiding portion (30) with opposite first and second ends and two contact portions (40) extending in opposite directions from the first end of the air-guiding portion (30), a recess (44) being formed in the first end of the air-guiding portion (30), and surface elevations (42) projecting from the surfaces of the contact portions (40) facing away from the second end of the air-guiding portion (30),
   inserting the air guiding portion (30) of the at least one air-guiding device (10) into a holding portion (312) of a cavity (310) of a tool device (300) so that the air-guiding portion (30) of the air-guiding device (10) is heat insulated by the holding portion (312) of the cavity (310), heating a composite part (100) having at least one continuous mating contact surface (140) for a pressing operation to a melting point of at least one material component of the composite part (100), heating the contact portions (40) of the at least one air-guiding device (10) to a melting point of at least one material component of the contact portions (40) of the air-guiding device (10) while the air-guiding portion (30) is heat-insulated by the holding portion (312) of the cavity (310), inserting the heated composite part (100) into the cavity (310) of the tool device (300), pressing the heated composite part (100) into a specified geometry of the multi-component part (200) with simultaneous formation of an integrally bonded connection between the at least one mating contact surface (140) of the composite part (100) and the contact portions (40) of the air-guiding device (10) so that the surface elevations (42) of the contact portions (40) and surface areas of the contact portions (40) adjacent the surface elevations (42) integrally bond to the at least one mating contact surface (140).

2. The method of claim 1, wherein the heating of the composite part (100) and/or the heating of the contact portions (40) of the air-guiding device (10) are/is carried out by thermal radiation.

3. The method of claim 1, wherein the pressing is carried out to form a complete or substantially complete form-fitting connection between the contact portions (40) of the air-guiding device (10) and the at least one mating contact surface (140) of the composite part (100).

4. The method of claim 1, wherein the step of inserting the air-guiding portion (30) of the at least one air-guiding device (10) into the holding portion (312) of the cavity (310) of the tool device (300) is carried out so that the air-guiding portion (30) of the air-guiding device (10) has a form-fitting reception in the holding portion (312) to achieve both mechanical stabilization and heat dissipation to the holding portion (312) of the tool device (300).

5. The method of claim 1, wherein the surface elevations (42) comprise points projecting partly into the at least one mating contact surface (140).

6. The method of claim 1, wherein the two contact portions (40) define first and second contact portions (40), a projecting distance of the first contact portion (40) from the air-guiding portion (30) is greater than a projecting distance of the second contact portion (40) from the air-guiding portion (30) so that a bonding force between the first contact portion (40) and the mating contact portion (140) is greater than a bonding force between the second contact portion (40) and the mating contact portion (140).

* * * * *